United States Patent [19]

Domeier

[11] Patent Number: 5,015,701
[45] Date of Patent: May 14, 1991

[54] COMPOSITION OF VINYL ESTER RESIN, HYDROXYALKYL (METH)ACRYLATE AND A STYRENE

[75] Inventor: Linda A. Domeier, Somerville, N.J.

[73] Assignee: Union Carbide Chemicals and Plastics Company Inc., Danbury, Conn.

[21] Appl. No.: 758,855

[22] Filed: Jul. 26, 1985

Related U.S. Application Data

[63] Continuation of Ser. No. 600,221, Apr. 17, 1984, abandoned, which is a continuation of Ser. No. 517,994, Aug. 1, 1983, abandoned, which is a continuation of Ser. No. 279,439, Jul. 1, 1981, abandoned.

[51] Int. Cl.$^5$ ............................................. C08L 63/10
[52] U.S. Cl. ................................... 525/531; 525/423; 525/922; 523/466; 523/468
[58] Field of Search ....................... 525/531, 922, 423; 523/466, 468

[56] References Cited

U.S. PATENT DOCUMENTS

| | | | |
|---|---|---|---|
| 3,256,226 | 6/1966 | Fekete et al. | 525/531 |
| 3,301,743 | 1/1967 | Fekete et al. | 525/922 |
| 3,367,992 | 2/1968 | Beardeli | 525/922 |
| 3,373,075 | 3/1968 | Fekete et al. | 428/288 |
| 3,377,406 | 4/1968 | Newey et al. | 525/531 |
| 3,432,478 | 3/1969 | May | 525/531 |
| 3,676,524 | 7/1972 | Takiyama | 525/922 |
| 3,683,045 | 8/1972 | Baldwin | 525/922 |
| 3,996,307 | 12/1976 | Liauval | 525/922 |
| 4,001,462 | 1/1977 | Bun | 525/922 |
| 4,028,294 | 6/1977 | Brown et al. | 525/531 |
| 4,144,156 | 3/1979 | Kuesters | 525/922 |
| 4,387,011 | 6/1983 | Makuischi et al. | 525/531 |

Primary Examiner—John C. Bleutge
Assistant Examiner—Robert E. L. Sellers, II
Attorney, Agent, or Firm—Paul W. Leuzzi, II

[57] ABSTRACT

Described herein are curable molding compositions comprising a mixture of:
(a) a vinyl ester produced by the addition of an unsaturated monocarboxylic acid to a polyepoxide and having a molecular weight greater than 300;
(b) acrylic or methacrylic acid or a functionalized derivative thereof having a molecular weight of less than 300;
(c) an ethylenically unsaturated monomer which is soluble in and copolymerizable with (a) and (b) and which is different from (b).

The compositions can also contain one or more fibers with a melting point or a glass transition temperature above about 130° C.

24 Claims, No Drawings

COMPOSITION OF VINYL ESTER RESIN, HYDROXYALKYL (METH)ACRYLATE AND A STYRENE

This application is a continuation of prior U.S. application Ser. No. 600,221, filed Apr. 17, 1984, now abandoned, which is a continuation of application Ser. No. 517,994 filed Aug. 1, 1983, now abandoned, which is a continuation of application Ser. No. 279,439 filed July 1, 1981, now abandoned.

This invention is directed to a curable molding composition containing (a) a vinyl ester produced by the addition of an unsaturated monocarboxylic acid to a polyepoxide, (b) acrylic or methacrylic acid or functionalized derivatives thereof which are different from (a), and (c) an ethylenically unsaturated monomer which is soluble in and copolymerizable with (a) and (b) and which is different from (b).

The combination of components in the composition of this invention have been found to produce reinforced articles having a particularly good balance of mechanical properties. Molded reinforced articles may be produced from the compositions of this invention by a very rapid mold cycle which is typically less than about 2 minutes from the time the cure of the resin is initiated.

The use of vinyl esters with combinations of comonomers is known in the art. For example, U.S. Pat. No. 3,373,075 describes a thermosetting resinous composition containing certain diacrylates (vinyl esters) formed by the reaction between a polyglycidyl ether of bisphenol A and a monocarboxylic acid possessing ethylenic unsaturation. The diacrylates are described as readily copolymerizable with monomers containing at least one terminal

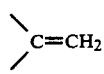

radical. Table II of this reference describes t use of various amounts of copolymerizable monomers, such as styrene, methyl methacrylate, ethylene glycol dimethacrylate, diallyl phthalate and triallyl cyanurate which are used with the diacrylates.

In column 13 of U.S. Pat. No. 3,373,075 there is described that the relatively high molecular weight diacrylates can be blended with lower molecular weight diacrylates, such as the di(3-methacryloxy-2-hydroxy propyl)ether of bisphenol A: described as a syrupy product in Example 2). The reference then states that such a mixture can be readily blended with and copolymerized with copolymerizable monomers, such as styrene and the like.

THE INVENTION

It has now been found that when a comonomer, i.e., acrylic or methacrylic acid or functionalized derivatives thereof, is added to a vinyl ester resin containing a vinyl ester and an ethylenically unsaturated monomer, the resulting resin compositions produce reinforced articles having substantially improved mechanical properties over those of composites which do not contain these particular comonomers.

It has also been found that certain ratios of the components of the compositions as well as particular components thereof offer enhanced cure speeds with mold closes cycles typically about 1.5 minutes or less from the time the cure of the resin is initiated. Such enhanced cure speeds are seen even in thick articles such as those which are 3/16 inches thick.

This combination of outstanding composite mechanical properties and, in many cases exceptional cure speed, make these resins especially suitable for the rapid production of glass-reinforced composites via the molding technology described below.

The improved curable molding composition of this invention comprises a mixture of (a) a vinyl ester produced by the addition of an unsaturated monocarboxylic acid to a polyepoxide and having a molecular weight greater than 300, (b) acrylic or methacrylic acid or a functionalized derivative thereof having a molecular weight of less than 300 and (c) an ethylenically unsaturated monomer which is soluble in and copolymerizable with (a) and (b) and which is different from (b).

The instant resin compositions have low viscosities, i.e., less than about 150 centipoise, preferably less than about 100 centipoise, so that they can be used to produce thermoset resin articles containing up to about 75 weight percent of reinforcing fibers by a very rapid mold cycle.

The vinyl esters which may be used in this invention are produced from the addition of an unsaturated monocarboxylic acid to a polyepoxide, and have molecular weights greater than 300. These vinyl esters are well known in the art and many are commercially available.

The unsaturated carboxylic acids which may be used include acrylic acid, methacrylic acid, crotonic acid, and acids prepared from the reaction of hydroxyalkyl acrylates or methacrylates with maleic anhydride, phthalic anhydride, and the like.

The polyepoxides may be saturated or unsaturated, aliphatic, cycloaliphatic, aromatic or heterocyclic and may be substituted, if desired, with noninterfering substituents, such as halogen atoms, hydroxyl groups, ether radicals, and the like.

The epoxides which may be used herein include: glycidyl ethers of novolac resins, i.e., phenol-aldehyde condensates. Preferred resins of this type are those of the formula I,

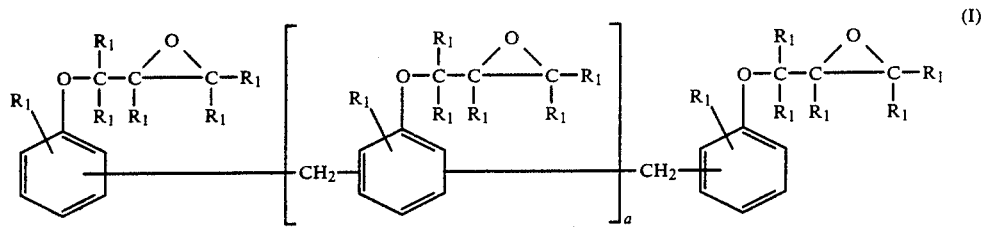

wherein R₁ is hydrogen or an alkyl radical and a has a value of from 0.1 to about 5, and preferably less than 1.0. Preparation of these polyepoxides is illustrated in, for example, U.S. Pat. Nos. 2,216,099 and 2,658,885.

Other examples of epoxides include the epoxidized esters of the polyethylenically unsaturated monocarboxylic acids, such as epoxidized linseed, soybean, perilla, olticica, tung, walnut and dehydrated castor oil, methyl linoleate, butyl linoleate, ethyl 9,12-octadecanedienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing compounds suitable for use wherein include the epoxidized esters of unsaturated monohydric alcohols and polycarboxylic acids, such as, for example,
di(2,3-epoxyoctyl)pimelate, Still another group comprises the epoxidized polyester obtained by reacting a polyhydric alcohol and an unsaturated polycarboxylic acid and/or anhydride, such as, for example, The polyester obtained by reacting 8,9,12,13-eicosanediendioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, and epoxidized dimer of cyclopentadiene.

A preferred polyepoxide includes the glycidyl polyethers of polyhydric phenols and polyhydric alcohols. Especially preferred are the diglycidyl polyethers of 2,2-bis(4-hydroxyphenyl)propane having the following formula:

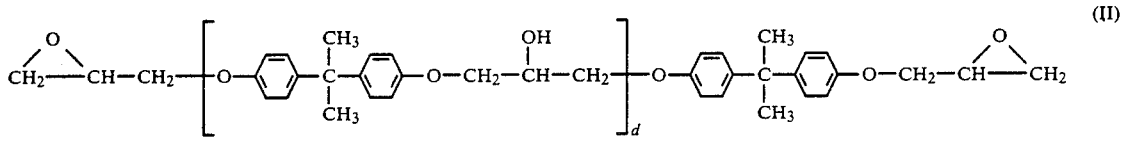

di(2,3-epoxyoctyl)tetrahydrophthalate,
(4,5-epoxydodecyl)maleate,
di(2,3-epoxyoctyl)terephthalate,
di(2,3-epoxypentyl)thiodipropionate,
di(5,6-epoxytetradecyl)diphenyldicarboxylate,
di(3,4-epoxyheptyl)sulfonyldibutyrate,
tri(2,3-epoxybuty)-1,2,4-butanetricarboxylate,
di(5,6-epoxypentadecyl)maleate,
di(,2,3-epoxybutyl)azelate,
di(3,4-epoxybutyl)citrate,
di(5,6-epoxyoctyl)cyclohexane-1,3-dicarboxylate,
di(4,5-epoxyoctadecyl)malonate.

Another group of the epoxy-containing materials include those epoxidized esters of unsaturated alcohols and unsaturated carboxylic acids, such as 3,4-epoxyhexyl3,4-epoxypentanoate, 3,4-epoxypentanoate, 3,4-epoxycyclohexylmethyl-3,4-epoxycyclohexane carboxylate, and the like.

Still another group of the epoxy-containing materials include epoxidized derivates of polyethylenically unsaturated polycarboxylic acids, such as, for example,
dimethyl 8,9,12,13-diepoxyeicosanediote;
dihexyl 6,7,10,11-diepoxyhexadecanedioate;
didecyl 9-epoxyethyl-10,11-epoxyoctadecanedioate;
dibutyl 3-butyl-3,4,5,6-diepoxycyclohexane1,2-dicarboxylate;
dicyclohexyl 3,4,5,6-diepoxycyclohexane-1,2-dicarboxylate;
dibenzyl 1,2,4,5-diepoxycyclohexane-1,2-dicarboxylate and
diethyl 5,6,10,11-diepoxyoctadecyl succinate.

wherein d has values so that the average molecular weight of the polyepoxide is from about 340 to about 2000.

The vinyl esters are well known and are produced by the methods described in, for example, U.S. Pat. Nos. 3,377,406; 3,637,618; 4,197,390 and 3,317,365. Acid modified vinyl ester resins may also be included in this invention. These are described, for example, in U.S. Pat. Nos. 3,634,542;3,548,030 and 3,564,074.

Component (b) in the composition of this invention is acrylic or methacrylic acid or a functionalized derivative thereof which is different from (a). Mixtures of these also may be used. The functionalized derivatives are characterized by the presence of acrylate, methacrylate, acrylamide, and methacrylamide groups and also by the presence of functional groups such as hydroxyl, amino, alkylamino, ether, and epoxide for example. The molecular weight of these monomers is typically less than 300. The preferred monomers are characterized by the following formula:

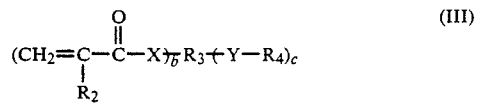

wherein R₂ is independently hydrogen or methyl; X and Y are independently -O- or

wherein $R_5$ is hydrogen or lower alkyl; $R_3$ is an aliphatic or aromatic radical containing from 2 to about 10 carbon atoms, optionally containing -O- or

$R_4$ is hydrogen or an aliphatic or aromatic radical containing from 1 to 10 carbon atoms; and b and c are integers of or greater than 1, preferably 1 to 3.

These functionalized derivatives of acrylic or methacrylic acid include 2-hydroxyethyl acrylate, 2-hydroxyethyl methacrylate, hydroxypropyl acrylate, hydroxypropyl methacrylate, hydroxybutyl acrylate, hydroxybutyl methacrylate, 2-aminoethyl acrylate, 2-aminoethyl methacrylate, 2-methylaminoethyl acrylate, 2-methylaminoethyl methacrylate, 2-dimethylaminoethyl acrylate, 2-dimethylaminoethyl methacrylate, 2-hydroxyethyl acrylamide, 2-hydroxyethyl methacrylamide, 2-aminoethyl acrylamide, 2-aminoethyl methacrylamide, diethylene glycol monoacrylate, diethylene glycol monomethacrylate, 2-methoxyethyl acrylate, 2-methoxyethyl methacrylate, pentaerythritol monoacrylate, pentaerythritol monomethacrylate, pentaerythritol diacrylate, pentaerythritol dimethyacrylate, pentaerythritol triacrylate, glycerol monoacrylate, glycerol monomethacrylate, trimethylolpropane monoacrylate, trimethylolpropane monomethacrylate, glycidyl methacrylate, glycidyl acrylate, hydroxymethyl acrylamide and the like, or mixtures thereof. It is understood that several isomers of many of these monomers exist and would be suitable for use hereiu either as individual components or as mixtures with any of the other monomers. Similarly, it is understood that additional derivatives containing aromatic rings and other alkyl groups in the acid or ester portion of formula (III) may also be included.

Component (c) of this invention is an ethylenically unsaturated monomer which is soluble in and copolymerizable with (a) and (b) and which is different from (b).

These ethylenically unsaturated monomers contain at least a single

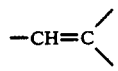

group, and preferably a

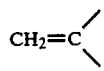

group and include styrene and its derivatives and homologues, divinylbenzene, diallylphthalate, nonfunctionalized esters of acrylic or methyacrylic acid (such as ethyl acrylate, butyl acrylate, and methyl methacrylate), unsaturated nitriles (such as acrylonitrile and methacrylonitrile), and the like. Also, the monomers include vinyl esters, e.g. vinyl acetate, vinyl propionate, and the like. Mixtures of the aforementioned monomers may be effectively employed in the practice of this invention.

The most preferred ethylenically unsaturated monomer contemplated in the practice of this invention is styrene.

In the composition of this invention component (a) is present in amounts of from about 10 to about 75, preferably from about 25 to about 60 weight percent; component (b) is present in amounts of from about 2 to about 75, preferably from about 5 to about 30 weight percent; and component (c) present in amounts of from about 10 to about 75, preferably from about 25 to about 65 weight percent.

A free-radical curing catalyst which initiates curing via the co-reaction of the vinyl ester resin, the acrylic or methacrylic acid or functionalized derivative thereof, and the ethylenically unsaturated monomer is included in this invention. These curing catalysts include azo compounds, peroxides, peresters, perketals and the like.

Azo and peroxide curing agents are described by, for example, Gallagher, et al. "Organic Peroxides Review", Plastics Design & Processing, July, 1978, pages 38–42, and August, 1978, pages 60–67, inclusive. The technology disclosed in those two articles is incorporated herein by reference. The choice of the specific peroxide or azo initiators for the purpose of curing the composition of this invention is within the purview of those having skill in this art and the manner in which such peroxides and azo initiators effect a desirable cure is generally characterized in the aforementioned articles.

Examples of such curing catalysts include 1,1-di-t-butylperoxycyclohexane, 2,2-di-t-butylperoxybutane, 2,2-di-t-butylperoxy-4-methylpentane, 2,2-dicumylperoxypropane, butyl 2,2-di-t-butylperoxyvalerate, 1,1-bis(2,2,4-trimethylpentyl-2-peroxy)cycylohexane, 2,2'-azo-bisisobutyronitrile, dibenzoyl peroxide, lauroyl peroxide, di-t-butyl peroxide, diisopropyl peroxide carbonate, t-butylperoxy-2-ethylhexanoate, t-butylperpivalate, 2,5-dimethylhexane-2,5-di-perethylhexanoate, t-butyl peroctoate, t-butyl perneodecanoate, t-butyl perbenzoate, t-butyl percrotonate, t-butyl perisobutyrate, di-t-butyl perphthalate, 1,1-bis(t-butylperoxy)-3,3,5-trimethylcyclohexane, bis(4-t-butylcyclohexyl)peroxydicarbonate, methyl ethyl ketone peroxide, 2,4-pentanedione peroxide, bis(t-butylperoxy)diisopropylbenzene, 2,4,4-trimethylpentyl-2peroxycyclohexane carboxylate, 2-t-butylazo-2-cyano-4methylpentane, ethyl 3,3-di-t-butylperoxy)butyrate, and the like. These are commercially available materials.

The peresters and perketals may be used in combination with an acid cure accelerator as described in Netherlands published Patent Application No. 7604405. These acids include Bronsted acids with a $pK_a$ value lower than or equal to that of formic acid, such as hydrochloric acid, sulfuric acid, nitric acid, phosphoric acid, trichloroacetic acid, p-toluenesulfonic acid, and the like. Also Lewis acids or metal halides with Lewis acid properties, such as boron trifluoride and the chlorides of iron, cobalt, zinc and aluminum, may be used.

Additionally, the above described curing catalysts may be used in combination with other cure accelerators such as cobalt compounds. These cobalt compounds include cobalt naphthenate, cobalt-amine cure promoters (such as those designated as PEP 183-S and available from Air Products Incorporated), and the like. These cure accelerators operate by decomposing the curing catalysts at a temperature below their normal activation or decomposition temperature.

Mixtures of the curing catalysts may be used herein, such as mixtures of peresters and/or perketals, of perketals and azo compounds, and of peresters and azo compounds.

The concentration of the curing agent can be varied within wide limits. As a representative range, the concentration can vary from about 0.25 to about 3.0 weight percent, preferably from about 0.5 to about 2.5 weight percent, and most preferably, from about 0.75 to about 2.0 weight percent, based on the weight of components (a), (b) and (c).

The compositions of this invention are prepared by solution blending the vinyl ester, the acrylic or methacrylic acid or functionalized derivative thereof, the ethylenically unsaturated monomer, a free radical curing catalyst, and any other optional ingredients at ambient temperatures.

The fibers, which may be used in this invention as reinforcing agents have a melting point or a glass transition temperature above about 130° C. These fibers include fiberglass, carbon fibers, aromatic polyamide fibers (such as aramid fibers sold by E. I. duPont de Nemours & Company, Wilmington, Del., under the trademark of Kevlar), metal fibers such as aluminum and steel fibers, boron fibers, and the like.

The carbon fibers include those having a high Young's modulus of elasticity and high tensile strength. These carbon fibers may be produced from pitch, as described in U.S. Pat. Nos. 3,976,729; 4,005,183 and 4,026,788, for example.

The preferred fibers are fiberglass, carbon fibers, aromatic polyamide fibers, and mixtures thereof.

The fibers which are suitable for use in this invention, preferably, have a length of at least ¼ inch, and an average length of at least ½ inch. Fibers with different lengths exceeding ¼ inch may be used, provided that at least about 50 percent of the fibers have lengths greater than ½ inch. Preferred fiber lengths are from 1 to 2 or more inches. Continuous filaments may also be used.

It is also within the scope of this invention to include the use of fiber reinforcements of shorter lengths and also fillers such as milled glass.

The molded article contains from about 10 to about 75, preferably from about 40 to about 70 weight percent of the reinforcement fiber or from about 20 to about 40 weight percent of milled glass reinforcement.

It is, furthermore, desirable to utilize a vinyl polymerization inhibitor in those cases where the resin solution is to be stored and/or shipped. Suitable vinyl polymerization inhibitors are hydroquinone, para-benzoquinone, t-butyl catechol, quinhydrone, toluhydroquinone, mono-t-butylhydroquinone, 2,5-di-t-butylhydroquinone, hydroquinone monomethyl ether, the biphenol derivatives described in U.S. Pat. No. 4,158,027, and the like. The amount of inhibitor for the purpose of preventing vinyl polymerization can be that conventionally used, namely from about 100 to about 1000 ppm of the combined weight of components (a), (b) and (c).

The composition of this invention may also include other ingredients, such as mold release agents, and the like.

A preferred procedure for producing a molded article from the compositions of this invention is described in U.S. Pat. Application Ser. No. 135,906 entitled "Molding Process and Apparatus Therefore", and filed on Apr. 14, 1980 in the name of R. Angell, Jr., which is incorporated herein by reference. In this application, a process for rapidly fabricating fiber reinforced thermoset resin articles is described. The fiber reinforcement is comprised of one or more fibers with a melting point or a transition temperature above about 130° C. The process comprises the steps of (a) providing one or more fibers with a melting point or a glass transition temperature above about 130° C. in the form of an interlocked mass in a heatable matched metal die mold, (b) providing in one or more accumulator zones, a liquid body of a thermosettable organic material having a viscosity determined at 120° C., in the absence of curing agent therefore, of less than about 50 centipoise, and which is curable upon heating to a thermoset resin composition, the viscosity of said liquid body being maintained essentially constant in the accumulator zone by keeping its temperature below that at which curing of said material is substantial, (c) closing the mold containing the web, (d) injecting at least a portion of said thermosettable organic material under pressure from said accumulator zone(s) into the mold to thereby fill the cavity in said mold, (e) initiating the curing of said material in said mold by subjecting the material to a temperature above the temperature at which the curing of said material is initiated, by heating the mold, and (f) opening said mold and removing the cured thermoset article therefrom.

In said U.S. Patent Application Ser. No. 135,906 the apparatus comprises: (a) a heatable matched die mold containing one or more cavities therein with means for opening said mold to expose such cacities, and closing the same, and means for controlling the injection of a thermosettable organic liquid to such cavities When the mold is closed, (b) means associated with said mod, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, (d) cooling means associated with the means for controlling the injection of such liquid to such cavities, whereby the temperature of the liquid in such injection means is maintained substantially below the temperature of the mold.

EXAMPLES

The following examples serve to illustrate specific embodiments of this invention and it is not intended that the invention shall be limited by the examples.

In the examples the flexural strength and modulus of the prepared composites were measured according to the procedure described in ASTM D-790 In each example, five separate flexural bars were tested from each plaque and the values listed are the average of those tests.

In each of the following examples a thermocouple was inserted in the mold midway through the glass mat and the cure rate was observed by measuring the time from resin injection to the time of maximum exotherm in the resin. This time span is designated below as the time to peak exotherm and the time given is an average of several runs. The apparatus used was similar to that described in U.S. Patent Application Ser. No. 135,906 described, supra.

A variety of commercial vinyl ester resins, based primarily on diglycidyl polyethers of bisphenol A were used in the Examples. These resins are designated as follows in the examples:

Vinyl resin 1: A vinyl ester resin containing the reaction product of methacrylic acid with a mixture of diglycidyl polyethers of bisphenol A using approximately one mole of methacrylic acid per mole of epoxide groups. The number average molecular weight (Mn) of the reaction product was approximately 900 to 1000. The vinyl ester resin is commercially available as a 50% styrene solution as Derakane 411-C50 (available from Dow Chemical Co.)

Vinyl resin 2: This Vinyl ester resin is similar to Vinyl resin 1 except that the vinyl ester has an Mn of 1100 to 1200. The vinyl ester was again the reaction product of methacrylic acid and a mixture of diglycidyl polyethers of bisphenol A. A 45 percent styrene solution of this vinyl ester is commercially available as Derakane 411-45 (available from Dow Chemical Co.). The commercial resin was diluted to a 50 percent styrene solution to form Vinyl resin 2.

Vinyl resin 3: A vinyl ester resin containing the reaction product of methacrylic acid with a mixture of diglycidyl polyethers of bisphenol A and glycidyl ethers of novolac resins using approximately one mole of methacrylic acid per mole of epoxide groups. The vinyl ester is commercially available as a 36 percent styrene solution as Derakane 470-36 (available from Dow Chemical Co.). The commercial resin was diluted to a 50 percent styrene solution to form Vinyl resin 3.

Vinyl resin 4: This vinyl ester resin is similar to Vinyl resin 1. The vinyl ester resin is commercially available as a 50 percent styrene solution as Epocryl 321 (available from Shell Chemical Co.).

Vinyl resin 5: This vinyl ester resin is similar to Vinyl resin 1 except that the vinyl ester has an Mn of 1300 to 1400. The vinyl ester is commercially available as a 45 percent styrene solution as Epocryl 322 (available from Shell Chemical Co.). The commercial resin was diluted to a 50 percent styrene solution to form Vinyl resin 5.

Vinyl resin 6: A modified vinyl ester resin containing in part, the reaction product of methacrylic acid with a mixture of glycidyl polyethers of bisphenol A using approximately one mole of methacrylic acid per mole of epoxide groups. The polyester is commercially available as a 40 percent styrene solution is Epocryl 480 (available from Shell Chemical Co.). The commercial resin was diluted to a 50 percent styrene solution to form Vinyl resin 6.

CONTROL A

Approximately 200 grams (approximately ten 10×5 ½ inch sheets) Type AKM glass mat (PPC Industries, Inc. Pittsburgh, Pa.) was placed in a 10×5 ½×3/16 inch constant volume mold preheated to 140° C. The mold was closed, evacuated for about 5 seconds, and a resin portion containing 100 weight percent of Vinyl resin-1, 0.5 phr Zelec UN mold release (an organophosphate mold release sold by E. I. duPont de Nemours, Wilmington, Del.), and 1.5 phr of 1,1-di-t-butylperoxy-3,3,5-trimethylcyclohexane (Trigonox 29-B-75 sold by Noury Chemical Corp., Burt, N.Y.) was injected at a pressure of 300 psi into the mold. The pressure was maintained for a dwell period of 10 seconds. A time to peak exotherm of about 75 seconds was measured. After 106 seconds, the cured glass reinforced composite was removed from the mold. The composite contained 66 weight percent glass as determined by ashing.

The composite was tested for flexural strength and modulus.

The results are shown in Table I.

EXAMPLE 1

The procedure of Control A was repeated except that the resin contained the following ingredients:
80 wt. percent Vinyl resin-1,
20 wt. percent 2-hydroxyethyl acrylate,
1.5 phr Trigonox 29-B-75, and
0.5 phr Zelec UN mold release.

A time to peak exotherm of about 63 seconds was observed.

The cured composite was removed from the mold after 83 seconds and tested as described in Control A.

The results are shown in Table I.

EXAMPLE 2

The procedure of Control A was repeated except that the resin contained the following ingredients:
80 wt. percent Vinyl resin-1,
20 wt. percent 2-hydroxyethyl methacrylate,
1.5 phr Trigonox 29-B-75, and
0.5 phr Zelec UN mold release.

A time to peak exotherm of about 70 seconds was observed.

The cured composite was removed from the mold after 98 seconds and tested as described in Control A.

The results are shown in Table I.

CONTROL B

The procedure of Control A was repeated except that the resin contained the following ingredients:
100 wt. percent Vinyl resin-2,
1.5 of Trigonox 29-B75, and
0.5 phr of Zelec Un mold release, A time to peak exotherm of about 64 seconds was observed.

The cured composite was removed from the mold after 90 seconds and tested as described in Control A.

The results are shown in Table I.

EXAMPLE 3

The procedure of Control A was repeated except that the resin contained the following ingredients:
80 wt. percent of Vinyl resin-2,
20 wt. percent of 2-hydroxyethyl acrylate,
1.5 phr of Trigonox 29-B-75, and 0.5 phr of Zelec UN mold release.

A time to peak exotherm of about 56 seconds was observed.

The cured composite was removed from the mold after 144 seconds and tested as described in Control A.

The results are shown in Table I.

EXAMPLE 4

The procedure of Control A was repeated except that the resin contained the following ingredients:
80 wt. percent of Vinyl resin-2,
20 wt. percent of 2-hydroxyethyl methacrylate,
1.5 phr of Trigonox 29-B-75, and
0.5 phr of Zelec UN mold release.

A time to peak exotherm of about 64 seconds was observed.

The cured composite was removed from the mold after 136 seconds and tested as described in Control A.

The results are shown in Table I.

CONTROL C

The procedure of Control A was repeated except that the resin contained the following ingredients:
100 wt. percent of Vinyl resin-3,
1.5 phr of Trigonox 29-B-75, and
0.5 phr of Zelec UN mold release.

A time to peak exotherm of about 76 seconds was observed.

The cured composite was removed from the mold after 155 seconds and tested as described in Control A.

The results are shown in Table I.

EXAMPLE 5

The procedure of Control A was repeated except that the resin contained the following ingredients:
80 wt. percent of Vinyl resin-3,
20 wt. percent of 2-hydroxyethyl acrylate,
1.5 phr of Trigonox 29-B-75, and
0.5 phr of Zelec Un mold release.

A time to peak exotherm of about 64 seconds was observed.

The cured composite was removed from the mold after 82 seconds and tested as described in Control A.

The results are shown in Table I.

EXAMPLE 6

The procedure of Control A was exactly repeated except that the resin contained the following ingredients:
80 wt. percent of Vinyl resin-3,
20 wt. percent of 2-hydroxyethyl methacrylate,
1.5 phr of Trigonox 29-B-75, and
0.5 phr of Zelec UN mold release.

A time to peak exotherm of about 62 seconds was observed.

The cured composite was removed from the mold after 84 seconds and tested as described in Control A.

A time to peak exotherm of about 78 seconds was observed.

The cured composite was removed from the mold after 96 seconds and tested as described in Control A.

The results are shown in Table II.

EXAMPLE 7

The procedure of Control A was exactly repeated except that the resin contained the following ingredients:
80 wt. percent of Vinyl resin-4,
20 wt. percent of 2-hydroxyethyl acrylate,
1.5 phr of Trigonox 29-B-75, and
0.5 phr of Zelec UN mold release.

A time to peak exotherm of about 64 seconds was observed.

The cured composite was removed from the mold after 90 seconds and tested as described in Control A.

The results are shown in Table II.

EXAMPLE 8

The procedure of Control A was exactly repeated except that the resin contained the following ingredients:
80 wt. percent of Vinyl resin-4,
20 wt. percent of 2-hydroxyethyl methacrylate,
1.5 phr of Trigonox 29-B-75, and
0.5 phr of Zelec UN mold release.

A time to peak exotherm of about 74 seconds was observed.

The cured composite was removed from the mold after 94 seconds and tested as described in Control A.

The results are shown in Table II.

CONTROL E

The procedure of Control A was exactly repeated except that the resin contained the following ingredients:

TABLE I

| Example | Resin Ingredients[1] | wt. % | Time to peak exotherm (sec.) | Molding time (sec.) | Wt. % glass | Properties of the Composite Flexural strength (psi) | Flexural Modulus (psi) × $10^6$ |
|---|---|---|---|---|---|---|---|
| Control A | Vinyl resin-1 | 100 | 75 | 106 | 66 | 34,000 | 1.94 |
| 1 | Vinyl resin-1 | 80 | 63 | 83 | 70 | 43,300 | 2.08 |
|  | HEA | 20 |  |  |  |  |  |
| 2 | Vinyl resin-1 | 80 | 70 | 98 | 67 | 40,700 | 2.04 |
|  | HEMA | 20 |  |  |  |  |  |
| Control B | Vinyl resin-2 | 100 | 64 | 90 | 65 | 29,600 | 1.97 |
| 3 | Vinyl resin-2 | 80 | 56 | 144 | 66 | 40,900 | 2.16 |
|  | HEA | 20 |  |  |  |  |  |
| 4 | Vinyl resin-2 | 80 | 64 | 136 | 64 | 36,200 | 2.11 |
|  | HEMA | 20 |  |  |  |  |  |
| Control C | Vinyl resin-3 | 100 | 76 | 155 | 66 | 25,600 | 1.68 |
| 5 | Vinyl resin-3 | 80 | 64 | 82 | 64 | 34,700 | 1.82 |
|  | HEA | 20 |  |  |  |  |  |
| 6 | Vinyl resin-3 | 80 | 62 | 84 | 66 | 29,400 | 1.89 |
|  | HEMA | 20 |  |  |  |  |  |

HEA = 2-hydroxyethyl acrylate
HEMA = 2-hydroxyethyl methacrylate

CONTROL D

The procedure of Control A was exactly repeated except that the resin contained the following ingredients:
100 wt. percent of Vinyl resin-4,
1.5 phr of Trigonox 29-B-75, and
0.5 phr of Zelec UN mold release.

100 wt. percent of Vinyl resin-5,
1.5 phr of Trigonox 29-B-75, and
0.5 phr of Zelec UN mold release.

A time to peak exotherm of about 79 seconds was observed.

The cured composite was removed from the mold after 98 seconds and tested as described in Control A.

The results are shown in Table II.

EXAMPLE 9

The procedure of Control A was exactly repeated except that the resin contained the following ingredients:

80 wt. percent of Vinyl resin-5,
20 wt. percent of 2-hydroxyethyl acrylate,
1.5 phr of Trigonox 29-B-75, and
0.5 phr of Zelec UN mold release.

A time to peak exotherm of about 72 seconds was observed.

The cured composite was removed from the mold after 87 seconds and tested as described in Control A. The results are shown in Table II.

EXAMPLE 10

The procedure of Control A was exactly repeated except that the resin contained the following ingredients:

80 wt. percent of Vinyl resin-5,
20 wt. percent of 2-hydroxyethyl methacrylate,
1.5 phr of Trigonox 29-B-75, and
0.5 phr of Zelec UN mold A time to peak exotherm of about 79 seconds was observed.

The cured composite was removed from the mold after 140 seconds and tested as described in Control A. The results are shown in Table II.

CONTROL F

The procedure of Control A was repeated except that the resin contained the following ingredients:

100 wt. percent of Vinyl resin-6,
1.5 phr of Trigonox 29-B-75, and
0.5 phr of Zelec UN mold release.

A time to peak exotherm of about 52 seconds was observed.

The cured composite was removed from the mold after 70 seconds and tested as described in Control A. The results are shown in Table II.

EXAMPLE 11

The procedure of Control A was repeated except that the resin contained the following ingredients:

1 80 wt. percent of Vinyl resin-6,
20 wt. percent of 2-hydroxyethyl acrylate,
1.5 phr of Trigonox 29-B-75, and
0.5 phr of Zelec Un mold release.

A time to peak exotherm of about 52 seconds was observed.

The cured composite was removed from the mold after 72 seconds and tested as described in Control A. The results are shown in Table II.

EXAMPLE 12

The procedure of Control A was repeated except that the resin contained the following ingredients:

80 wt. percent of Vinyl resin-6,
20 wt. percent of 2-hydroxyethyl methacrylate,
1.5 phr of Trigonox 29-B-75, and
0.5 phr of Zelec UN mold release.

A time to peak exotherm of about 63 seconds was observed.

The cured composite was removed from the mold after 78 seconds and tested as described in Control A. The results are shown in Table II.

TABLE II

| Example | Resin Ingredients[1] | wt. % | Time to peak exotherm (sec.) | Molding time (sec.) | Wt. % glass | Flexural strength (psi) | Flexural Modulus (psi) $\times 10^6$ |
|---|---|---|---|---|---|---|---|
| Control D | Vinyl resin-4 | 100 | 78 | 96 | 65 | 34,500 | 2.00 |
| 7 | Vinyl resin-4 | 80 | 64 | 90 | 64 | 42,900 | 2.00 |
|   | HEA | 20 | | | | | |
| 8 | Vinyl resin-4 | 80 | 74 | 94 | 66 | 42,400 | 2.14 |
|   | HEMA | 20 | | | | | |
| Control E | Vinyl resin-5 | 100 | 79 | 98 | 64 | 41,600 | 2.06 |
| 9 | Vinyl resin-5 | 80 | 72 | 87 | 65 | 44,500 | 2.10 |
|   | HEA | 20 | | | | | |
| 10 | Vinyl resin-5 | 80 | 79 | 140 | 65 | 43,400 | 2.17 |
|   | HEMA | 20 | | | | | |
| Control F | Vinyl resin-6 | 100 | 52 | 70 | 67 | 30,200 | 2.08 |
| 11 | Vinyl resin-6 | 80 | 52 | 72 | 64 | 31,900 | 1.98 |
|   | HEA | 20 | | | | | |
| 12 | Vinyl resin-6 | 80 | 63 | 78 | 64 | 42,100 | 2.23 |
|   | HEMA | 20 | | | | | |

[1]HEA = 2-hydroxyethyl acrylate
HEMA = 2-hydroxyethyl methacrylate

What is claimed is:

1. A curable molding composition comprising a mixture of:
   (a) from about 25 to about 60 weight percent of a vinyl ester produced from the addition of an unsaturated monocarboxylic acid to a polyepoxide, and having a molecular weight greater than 300;
   (b) from about 5 to about 30 weight percent of 2-hydroxyethyl acrylate, 2-hydroxyethyl methacrylate, hydroxypropyl acrylate, or hydroxypropyl methacrylate; and
   (c) from about 25 to about 65 weight percent of an ethylenically unsaturated monomer selected from styrene, its derivatives and homologues.

2. A curable composition as defined in claim 1 wherein the unsaturated monocarboxylic acid is selected from acrylic acid, methacylic acid, crotonic acid, and acids prepared from the reaction of hydroxyalkyl acrylates or methacrylates with maleic or phthalic anhydride.

3. A curable composition as defined in claim 1 wherein the polyepoxide is saturated or unsaturated aliphatic, cycloaliphatic, aromatic or heterocyclic which may be substituted with halogen atoms, hydroxyl groups and ether radicals.

4. A curable composition as defined in claim 1 wherein the polyepoxide is an epoxidized ester of an unsaturated monohydric alcohol and unsaturated monocarboxylic acid.

5. A curable composition as defined in claim 1 wherein the polyepoxide is an epoxidized ester of unsaturated monohydric alcohol and polycarboxylic acid.

6. A curable composition as defined in claim 1 wherein the polyepoxide is an epoxidized ester of a polyethylenically unsaturated monocarboxylic 7. A curable composition as defined in claim 1 wherein the polyepoxide is an epoxidized derivative of a polyethylenically unsaturated polycarboxylic acid.

8. A curable composition as defined in claim 1 wherein the polyepoxide is an epoxidized polyethylenically unsaturated hydrocarbon.

9. A curable composition as defined in claim 1 wherein the polyepoxide is an epoxidized polyester obtained by reacting a polyhydric alcohol and an unsaturated polycarboxylic acid and/or anhydride.

10. A curable composition as defined in claim 1 wherein the polyepoxide is the glycidyl polyether of a polyhydric phenol and/or a polyhydric alcohol.

11. A curable composition as defined in claim 1 wherein the polyepoxide is of the following formula:

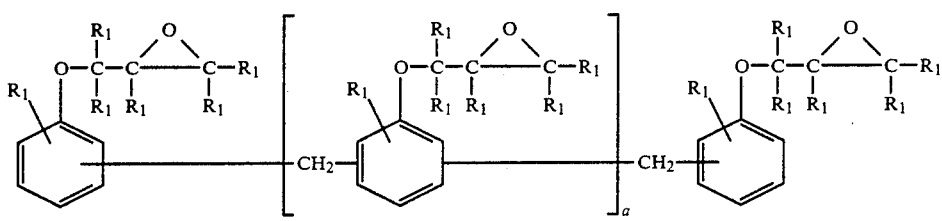

wherein $R_1$ is hydrogen or an alkyl radical and (a) has a value of from 0.1 to about 5.

12. A curable composition as defined in claim 1 wherein the polyepoxide has the following formula:

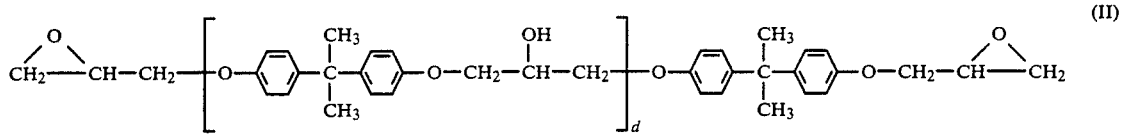

wherein d has values so that the average molecular weight of the saturated polyepoxide is from about 340 to about 2000.

13. A curable composition as defined in claim 1 wherein component (b) comprises 2-hydroxyethyl acrylate.

14. A curable composition as defined in claim 1 wherein component (b) comprises 2-hydroxyethyl methacrylate.

15. A curable composition as defined in claim 1 wherein the ethylenically unsaturated monomer comprises styrene.

16. A curable composition as defined in claim 1 which contains a curing inititator.

17. A curable composition as defined in claim 16 wherein the curing initiator is a perester and/or perketal, or a mixture of peresters and/or perketals.

18. A curable composition as defined in claim 16 wherein the curing initiator is an azo and/or peroxide containing compound.

19. A curable composition as defined in claim 16 wherein the curing initiator is a mixture of an azo compound and a perester and/or perketal.

20. A curable composition as defined in claim 16 which contains an acidic cure accelerator.

21. A curable composition as defined in claims 16 or 17 or 18 or 19, which contains an accelerator comprising a cobalt containing compound.

22. A molded article prepared from the composition of claim 1.

23. A molded article as defined in claim 22 which contains from about 10 to about 75 weight percent of one or more fibers having a melting point or a glass transition temperature above about 130° C.

24. A molded article as defined in claim 23 wherein the fiber is selected from fiberglass, carbon fibers, aromatic polyamide fibers, and mixtures thereof.

* * * * *